March 18, 1952  C. W. MOTT  2,589,845
HAMMER KNIFE MOWER
Filed Aug. 16, 1947  3 Sheets-Sheet 1

Inventor:
Carl W. Mott
By Paul O. Pippel
Atty.

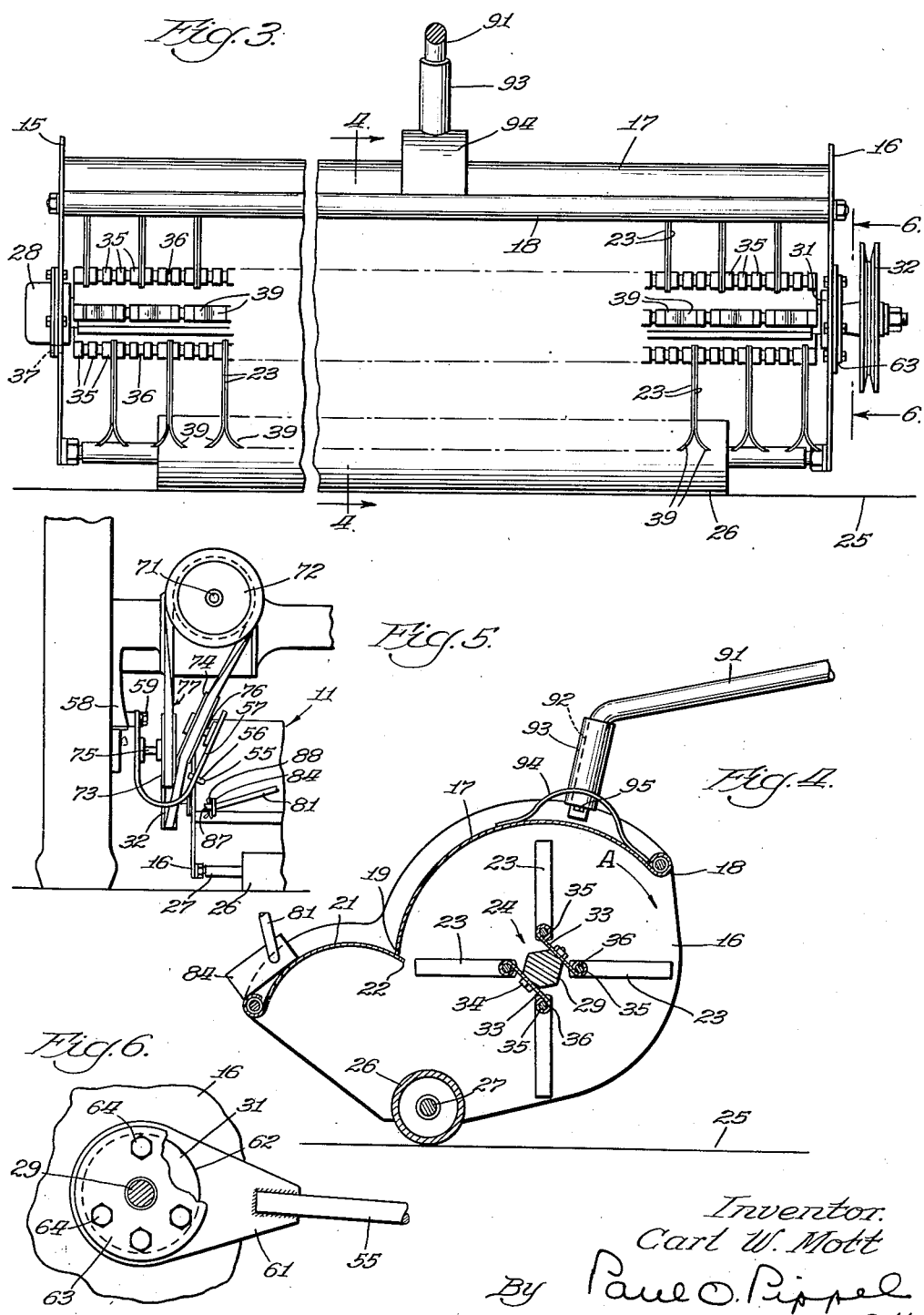

March 18, 1952     C. W. MOTT     2,589,845
HAMMER KNIFE MOWER
Filed Aug. 16, 1947     3 Sheets-Sheet 3
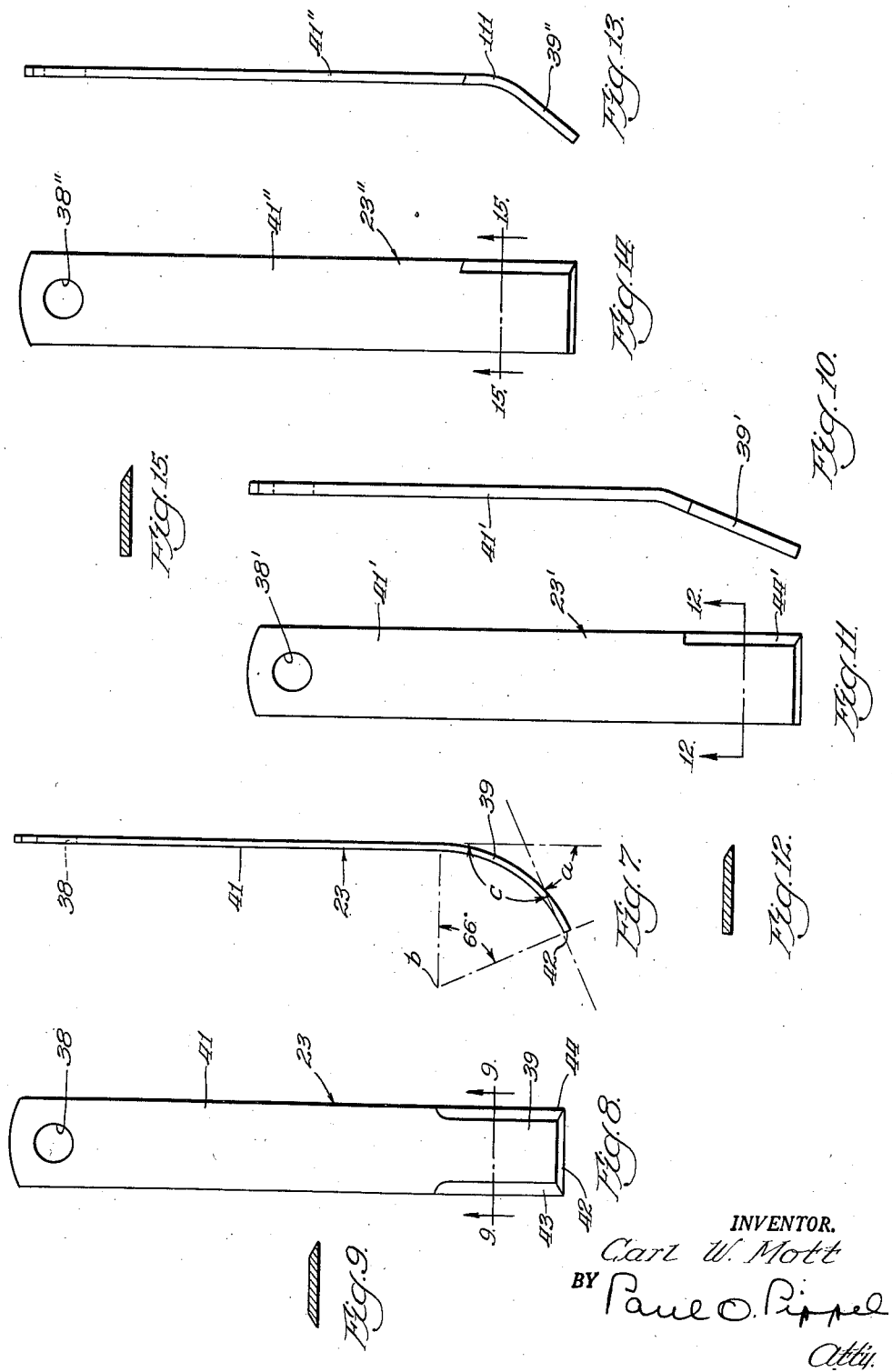
INVENTOR.
Carl W. Mott
BY Paul O. Pippel
Atty.

Patented Mar. 18, 1952

2,589,845

UNITED STATES PATENT OFFICE 2,589,845

HAMMER KNIFE MOWER

Carl W. Mott, La Grange, Ill., assignor to International Harvester Company, a corporation of New Jersey Application August 16, 1947, Serial No. 768,993

7 Claims. (Cl. 56—25)

This invention concerns mowers for the cutting of grass or the like and primarily concerns a mower of the type employing flails pivotally mounted on a carrier which is rotatable at high speed about a horizontal axis for sweeping cutting edges of the flails into the grass to crop the same.

An important object of this invention is the provision of a mower capable of cutting abnormally tall grass, in addition to being serviceable for cutting grass of normal height to obtain a normally close cropped condition of such areas as lawns and golf courses. This object is accomplished by employing flails pivotally mounted upon a rotatable carrier for swinging radially outwardly therefrom when the carrier is rotated at high speed, thus enabling sharpened end portions of the flails to chop the grass into short pieces irrespective of the position of the grass stems at the time of being intercepted by the flails. This principle of operation enables the mower to operate analogously to a hammer mill, the bottom of the mower unit being open, whereby the flails can cooperate with the ground surface in much the same manner that the knives of a hammer mill cooperate with an opposed wall which holds the material that is to be comminuted within reach of rotating flails.

A further object is the provision of an improved type of cutter flail or knife provided with a cutter end portion turned outwardly from a pivotally supported shank portion in a manner enabling the cutter portion to cut a miniature swath while accommodating centrifugal discharge of cut grass stems endwise from the knife.

Another object is the provision of a hammer knife type of mower embodying knives according to the next proceeding object arranged in pairs with the shanks of each pair in back-to-back relation and the outwardly turned cutter end portions of each pair in diverging relation. This arrangement causes the shank of each knife to react against the shank of the knife paired therewith, so that normally the paired knife shanks complementally reinforce one another but are slightly separable under the force of hard non-cuttable foreign objects which may accidentally lodge between paired shanks, and this capability of the paired knife shanks minimizes the likelihood of their being broken by such foreign objects as sticks, shrubbery stems or other relatively large foreign objects projecting upwardly from the ground surface.

Another object is the provision of a novel mounting means for convenient attachment and detachment of the hammer knives upon the rotatable carrier.

A further object is the provision of a novel casing for the rotary carrier and knives, including a guard shroud extending axially of the carrier for covering the upper side and the upper rear side thereof while leaving a discharge space beneath the lower rear edge of the shroud, and also including a rearwardly arched deflector wall extending lengthwise of the carrier along the rearward edge of the shroud for intercepting the cut grass to prevent it being swept around with the knives forwardly under the shroud and consequent discharge forwardly of the unit upon the grass to be cut. The deflector wall is thus operable to cause the discharge of the cut grass rearwardly of the advancing mower unit.

Still another object is the provision of a new mounting means for mounting the mower unit transversely of and beneath the body of a tractor in a manner facilitating independent vertical movement of the ends of said mower unit while curtailing fore and aft movement of the unit, whereby the unit is caused to move with the tractor and is allowed to follow the contour of an irregular ground surface.

A still further object is the provision of an improved mounting means for mounting the unit beneath the body of the tractor in a manner adapting transmission of power to the unit by a belt extending from power take-off pulley means of the tractor to a pulley with which the rotatable carrier of the unit is constrained for rotation.

It is believed these and other desirable objects inherent in and encompassed by the invention will be fully comprehended from the ensuing description and the annexed drawings, wherein:

Figure 3 is an enlarged front elevational view of the mower unit with only part of the hammer knives and of the rotor carrying the same shown in detail.

Figure 4 is an enlarged sectional view taken through the mower unit at the plane indicated by line 4—4 in Figure 3.

Figure 5 is a fragmentary rear elevational view of the tractor and of one end of the mower unit, illustrating power take-off means on the tractor and the driving connection thereof with the mower unit.

Figure 6 is a fragmentary end view of the mower unit taken at the plane indicated by the line 6—6 in Figure 3, and illustrating the pivotal connection of a thrust member of the mounting means with such end of the unit.

Figure 7 is an enlarged elevational view looking edgewise of a form of knife or flail used in the mower unit.

Figure 8 is an elevational view looking flatwise of the knife of Figure 7.

Figure 9 is a transverse view taken on the line 9—9 of Figure 8.

Figure 10 is an enlarged elevational view taken edgewise of a modified form of knife or flail.

Figure 11 is an elevational view taken flatwise of the knife of Figure 10.

Figure 12 is a sectional view taken on the line 12—12 of Figure 11.

Figure 13 is an enlarged elevational view taken edgewise of a third form of knife or flail.

Figure 14 is an elevational view taken flatwise of the knife of Figure 13.

Figure 15 is a sectional view taken on the line 15—15 of Figure 14.

Figure 1:
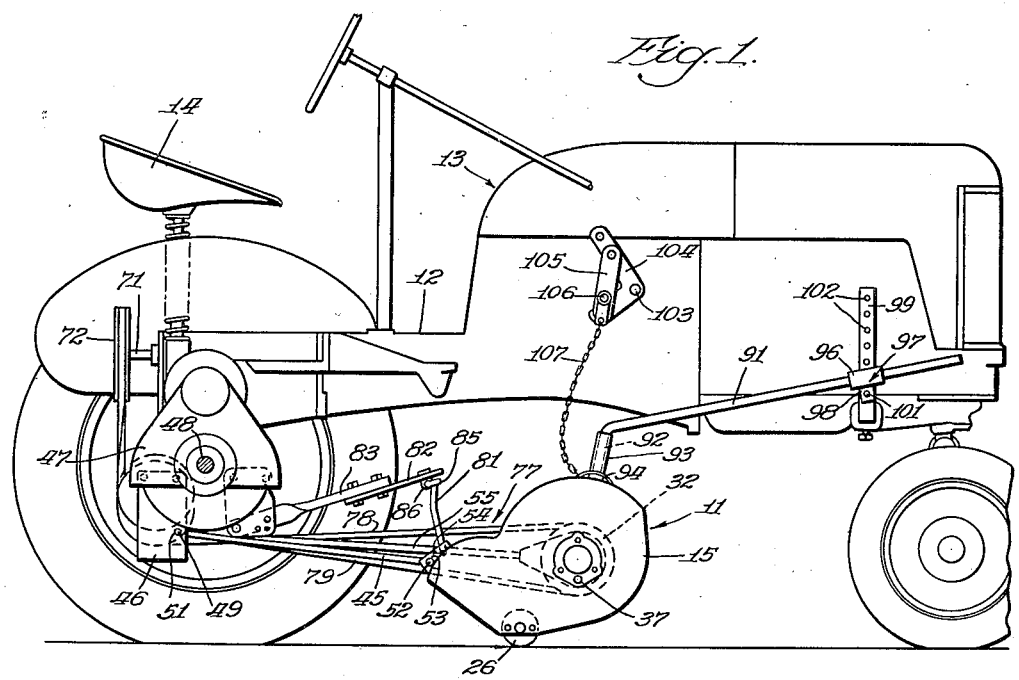
Figure 1 is a side elevational view of a wheel-type tractor having the rear traction wheel at the near side of the tractor removed for exposing a portion of mounting means for mounting a preferred form of the invention which is shown in end elevation beneath the tractor body.
Figure 2:
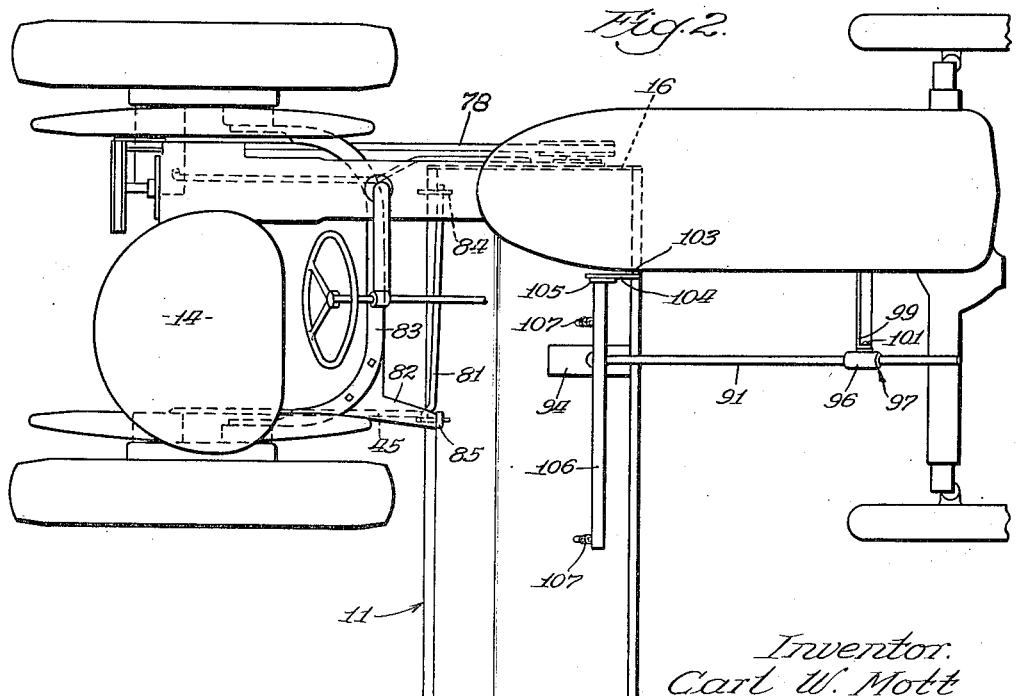
Figure 2 is a plan view of the tractor and of the present mower unit mounted thereon.

With continued reference to the drawings and particularly to Figures 1 and 2, a mower unit 11 is shown mounted beneath the body 12 of a wheel-type of tractor 13 and extending transversely with respect thereto and outwardly from the right side thereof when considered with respect to an operator in the tractor seat 14.

Said mower unit includes a rotor chamber including end walls 15 and 16 and a semi-cylindrical cover shroud 17 extending therebetween lengthwise of the unit. Cover shroud 17 has a front edge 18 and a rear edge 19, thereby providing an open front side of the rotor chamber beneath the edge 18, an open bottom side for such chamber and an open lower portion of a rear side of the chamber beneath the rear edge 19. A deflector wall 21, which is arched transversely, extends lengthwise between the end walls of the unit and has a front edge 22 disposed adjacently to the rear edge 19 of the cover shroud and also adjacently to a circular path traversed by the outer ends of hammer knives or flails 23 during rotation of a carrier structure 24 upon which such flails are pivotally mounted. This carrier structure 24 rotates in the direction indicated by the arrow A in Figure 4, whereby the flails are caused to cut grass or the like of which the stems project upwardly from a ground line 25 and sweep the cut grass stems rearwardly through a discharge space beneath the rear edge 19 of the shroud and beneath the arched deflector wall 21. Disposal of the front edge of the deflector wall 21 adjacently to the circular path traversed by the outer ends of the flails enables this deflector plate to intercept the precipitated grass stems and prevent them from being carried upwardly and forwardly beneath the shroud 17, which action would cause accumulation of such stems in front of the unit so that its operation would be impeded.

When the unit is in operation, it is partly carried by a long cylindrical ground-engaging roller 26 journaled upon a bearing rod 27 extending between the chamber end walls 15 and 16 and secured thereto.

End wall 15 has a bearing unit 28 mounted thereon for rotationally supporting one end of a rotatable core or rod 29 of the carrier 24. Said rod 29 is hexagonal in cross-section as illustrated in Figure 4. The opposite end of the rod 29 passes through a hole (not shown) in the end wall 16 and also through a bearing 31 which is mounted upon such wall. This bearing rotatably supports the end of the rod passing therethrough, and that portion of the rod projecting exteriorly of the end wall 16 carries a belt pulley 32 which is constrained for rotation therewith. Pulley 32 constitutes part of the driving train for the rotatable flail carrier 24.

The carrier rod 29 together with elongated plates 33 secured to opposite facets thereof by bolts 34 make up a center structure of the carrier. Each plate 33 has a row of tongues 35 projecting outwardly from each of its opposite longitudinal edges, the tongues in each row being spaced apart axially and being bent into circular formations about axes extending endwise of the carrier. Each row of the circularly bent tongues 35 slidably receives a pivot rod 36 for pivotal attachment of an associated row of flails 23. A hole 37 extending through a flange of the bearing 28 and through the mower unit end wall 15 is placed for axial alinement with the rows of circularly curved tongues 35 to facilitate endwise withdrawal and reinsertion of the rods pursuant to assembly or replacement of the flails 23. In Figure 8 where one of the flails is shown in elevation, it can be seen that the flails have a hole 38 for receiving their associated pivot rod 36. Assembly of the flails onto their associated pivot rod is accomplished by insertion of the flat flail shank between certain of the axially spaced circularly curved tongues 35 to place the holes 38 in alinement with the axis of the circularly bent tongues preparatory to endwise sliding of the rod for causing it to pass through the holes 38. In Figure 3 the flails 23 are shown mounted in pairs, each pair having straight shank portions arranged in back-to-back relation and with outwardly curved portions 39 in diverging relation. The diverging portions 39 of the flails cut narrow swaths of grass stems during rotation of the carrier and since the pairs of flails on each rod 36 are spaced apart axially thereof, the pairs of flails on adjacent rods are disposed out of alinement circumferentially of the carrier so the space between the circular paths transversed by the outwardly turned flail end portions on each rod will be traversed by the outer end portions of flails on adjacent rods during each revolution of the carrier.

The flails shown in Figures 3, 4, 7, 8 and 9 each comprise a rigid strap-like body of metal having a straight shank portion 41 and a cutter end portion 39 adjacently to a free end 42 of such body. In Figure 7 it is illustrated that said end portion 39 of this species of flail extends endwise from the straight shank portion 41 while turning outwardly from one of the broad flat faces of the shank portion to space the free end 42 outwardly from such face. Such outward turning of the end portion 39 is at an acute angle of departure $a$ from the flat faces of the shank 41, this angle of departure being sufficiently restricted to accommodate centrifugal discharge of cut grass axially of the flail along the outwardly turned section 39 and over the free end 42. An angle $a$ not substantially exceeding 65° is preferred for enabling the flail end portion to cut a reasonably wide swath while avoiding accumulation of grass stems upon such end portion. The end portion 39 illustrated in Figure 7 has an angle of departure $a$ of 66° which has been found in practice to give excellent results.

It will also be observed in Figures 7, 8 and 9 that the outwardly turned end portion 39 has sharpened opposite edges and that the bevels 43 and 44 forming such edges slope from a common broad face of the strap-like body of the flail to the opposite face thereof. The cutter-end portion 39 conforms to an arc generated about an axis $b$, Figure 7, and subtends an arc of 66°. The angle $c$ included between the shank 41 and the end portion 39 is 105°. By sharpening both edges of the outwardly turned flail end portions, the flails are made reversible, making it possible to change to a fresh cutting edge for striking the grass after the other of the edges has become dull or mutilated.

Mounting means for attaching the mower unit 11 to the tractor includes a thrust rod 45 pivotally connected at its rear end with a bracket 46 anchored to a gear housing 47 depending from a rear portion of the tractor and containing gears (not shown) through which power is transmitted to a rear axle 48 for the wheel which has been removed exposing such housing 47 in Figure 1. Pivotal connection of the thrust rod or member 45 with the bracket 46 is by means of a perpendicular end portion 49 inserted through a hole 51 in the bracket. A perpendicularly turned end portion 52 of the forward end of the rod 45 is disposed pivotally within a hole 53 of a bracket 54 which is suitably mounted on the deflector wall 21 of the mower unit.

A complemental thrust member or rod 55, Figures 1, 2 and 6, is pivotally connected by a perpendicularly turned rear end portion 56 with a hole in a U-shaped bracket 57 which is secured to a depending gear housing 58 by capscrews 59, Figure 5. The front end of the thrust member 55 carries a bearing plate 61 having a bearing hole 62 journaled upon a cylindrical periphery of the bearing 31 carried by the mower unit end wall 16; see Figure 6. A circular retainer plate 63 of greater diameter than the cylindrical bearing 62 is secured to the end of the bearing member 31 by capscrews 64 for retaining such bearing member on the bearing unit 31 in a manner permitting the mower unit to be pivoted about the axis of the bearing 62.

Power take-off means for rotating the carrier 24 of the mower unit includes a power take-off shaft 71 carrying a belt pulley 72 for rotation therewith. Additional pulleys 73 and 74 are rotatably carried by stub-shafts 75 and 76, respectively, on the U-shaped bracket 57. An endless belt 77, trained over the pulleys 72, 73 and 74 and the pulley 32 at the left end of the mower unit, is adapted to rotate the carrier 24 and the cutter flails 23 thereon in the direction of the arrow in Figure 4. The pivotal connections of the thrust members 45 and 55 at their rear ends with the brackets 46 and 57, respectively, and at their forward ends with the mower unit accommodate independent upward and downward displacement of the mower unit 11 as is necessary for the ground-engaging roller 26 to follow the contour of uneven ground. Up and down movement of the left end of the mower unit, which carries the pulley 32, has negligible effect upon tautness of the belt 77 since the flights 78 and 79 thereof reaching forwardly about the pulley 32 are swingable about a locus at the point of their departure from the pulleys 73 and 74 that is substantially coincident with the rear pivot axes of the thrust members 45 and 55.

Means for stabilizing the mower unit 11 by curtailing endwise movement thereof transversely of the tractor is in the form of a link 81 pivotally connected between a bracket 82, mounted on a bail-type draw-bar 83 of the tractor, and a bracket 84, Figures 2, 4 and 5, mounted on a left-end portion of the deflector wall 21. An eye-bolt 85 on the right end of the transverse rod 81 hooks through a hole 86 in a portion of the bracket 82, whereas an angularly turned end portion 87, Figure 5, is inserted through a hole in the bracket 84. A cotter pin 88 prevents accidental withdrawal of the rod end portion 87 from the apertured bracket 84. The aperture in the bracket 84 is slightly oversize with respect to the rod end portion inserted therein so the connection between the rod and bracket 84, while precluding relative endwise movement, will permit pivotal movement thereof to facilitate vertical displacement of the mower unit.

The mower unit is tiltable about the axis of the ground roller 26. Such tilting occurs when the flail carrier is moved upwardly or downwardly while the roller 26 remains in contact with the ground. This upward or downward adjustment of the flail carrier determines the proximity of cutter flails with the ground and the length of the stubble in the mowed swatch cut by the unit.

Means for maintaining a selected tilt of the unit for determining the height of grass to be cropped includes a rod 91 having a bent end portion 92 at its rear end inserted through a sleeve 93 fixed to a bracket 94 on the casing shroud 17. A pin 95 in the lower end of the rod portion 92 prevents accidental withdrawal from the sleeve 93. A forward end portion of the rod 91 is slidably received within a bearing 96 and a support member 97. This support member has an apertured extension 98 pivotally connectable with a bracket 99 upon the tractor by means of a pin 101 selectively insertable into holes 102 spaced vertically in the bracket. When the support member 97 is pivotally connected with higher holes 102 of the bracket 99, the front end of the rod 91 will be raised and correspondingly raise the cutter flails from the ground by tilting the front end of the unit 11 upwardly about the axis of the ground roller 26. This tilting adjustment of the mower unit for determining the height of grass to be cropped is independent of bodily up and down movement of the mower unit as facilitated by the pivoted thrust rods 45 and 55 which enables the unit to follow the ground contour despite the presence of hummocks and depressions. This bodily up and down movement of the mower unit causes the support member 97 to pivot about its mounting pin 101 and causes slight endwise movement of the rod 91 in the bearing 96, but without perceptibly changing the tilt of the unit and the height at which the grass is cropped, which is determined by the height at which the support 97 is mounted on the bracket 99.

Lifting of the mower unit to a transport position out of contact with the ground is accomplished by lift means upon the tractor. This lift means comprises a rock-shaft 103 having a bell-crank 104 constrained for rotation therewith. The bell-crank carries an elongated base plate 105 from which a rod 106 projects horizontally outwardly as shown in Figure 2. A pair of lift chains 107 are spaced lengthwise of the rod 106 and connected between this rod and the mower unit 11 so that when the rock-shaft 103 is rotated clockwise, as viewed in Figure 1, the chains 107 will become taut and carried upwardly with the mower unit. When the rockshaft is in the position illustrated in Figure 1, a certain amount of slack is caused to prevail in the chains 107 so they will avoid trammelling vertical displacement of the unit for following an irregular ground contour.

While the mover unit is resting upon the ground roller 26 and the tractor is driven forwardly, power received from the power take-off shaft 71 and transmitted through the belt 77 will cause rotation of the carrier 24, Figure 4, in the direction of the arrow. The cutter end portions of the flails 23 are thereby caused to travel in a circular path at sufficiently high speed for chopping grass entering the front open side of the rotor chamber. Because of the high speed of the rotor relatively to the forward ground speed of the unit, the flails will successively strike different sections of the same grass stems, causing these stems to be chopped or cut in short lengths and these short lengths of grass are swept rearwardly by the rotating flails into the discharge passage beneath the deflector plate or wall 21. Because of the proximity of the front edge 22 of the wall 21 with the circular path traversed by the ends of the flails 23, and because of the arched construction of this wall, the creation of an air current moving circumferentially of the shroud 17 with the flails 23 of a magnitude for carrying a significant portion of the chopped grass stems upwardly past the wall edge 22 and forwardly beneath the shroud 17 for discharge onto the uncut grass is precluded. This disposition of the deflector wall 21 in the manner illustrated in Figure 4 causes the mower unit to discharge the cut grass stems in the formation of a broad thin stream from the trailing edge of the curved wall 21. When the machine is cutting tall grass the cut stems are chopped in sufficiently short pieces which filter downwardly into the stubble to form a mulch in contrast to a destructive cover as would be the case if the stems were left long.

By disposing the front edge 18 of the shroud 17 above the rotational axis of the carrier 24, the cutting ends of the flails are adapted to project slightly forwardly of this edge of the shroud for striking portions of tall grass stems that are considerably above the ground surface. When mowing tall grass, which may be of a length that its upper ends are higher than the mower unit, the rotating flails are thus permitted to strike intermediate portions of the grass stems, and, because of the downward motion of the cutter end portions of the flails at the time of striking the grass stems, the upper portions of the grass stems above the point of contact with the flails are drawn endwise downwardly into the path of the advancing mower unit and are chopped together with shorter stems which do not project so high. By maintaining the high rotating speed of the carrier 24 and diminishing the forward speed of the unit, plots of grass and small shrubs approximately three feet tall have been successfully mowed. The unit is therefore very effective for mowing areas upon which the vegetation growth has reached a state of development beyond the possibility of mowing by conventional mowers using a bladed reel in conjunction with a cutter-bar.

Another advantage of the present mower unit is its extreme effectiveness in the cutting of weeds with tall tough slender stems commonly seen projecting upwardly from lawns mowed with the conventional bladed reel cutter-bar mower which merely bends and passes over this type of weed instead of cutting the stem. In the present mower the flails chop the stems of such weeds into short pieces in the same fashion as any grass stem.

The present mower is also effective for controlling the growth of weeds which grow close to the ground because of the adjustability of the unit for causing the cutter end portions of the flails to sweep as closely to the ground as desired; in fact, the flails can be caused to dig slightly into the ground surface if desired.

It should be understood therefore that the present unit can be used for grooming large areas, such as estate lawns and golf courses where the grass has gotten out of control of the mowers conventionally used on these large plots of ground, and the present mower is also adapted for maintaining the groomed condition of these ground plots. Because of the adjustability of the unit for cropping the grass to leave a stubble of desired length, the unit is particularly useful on golf courses where the fairways are to be cropped relatively closely while the "rough" adjoining the fairways is to consist of longer grass. With the present unit the length of the grass in the "rough" areas can be economically maintained at a desired uniform length, leaving these areas effective for their purpose while possessing a groomed appearance in contrast to the unkempt condition found in most golf courses.

By arranging the flails or hammer knives in pairs and with the knives of each pair in back-to-back relation, as illustrated in Figure 3, the knives of each pair are adapted to react against and reenforce one another. This reenforcement is of a character as not to interfere with separation of the contiguous shank portions of the paired knives in the event of their encountering an unusually thick shrub stem or other object not readily cuttable by the unit, and in this way cause the knives to spread apart in contrast to being broken.

Figures 10, 11 and 12 illustrate a modified form of cutter flail or knife substitutable for that shown in Figures 7, 8 and 9. This modified form of knife differs from that of Figures 7, 8 and 9 in the respect of having a straight outwardly turned portion 39' instead of this portion being curved as the corresponding portion 39 of the first embodiment. A cutting edge 44' is formed upon only one edge of this second knife embodiment, although it is contemplated that the outwardly turned cutter end portion may have its opposite edge sharpened as illustrated in Figure 8.

A third embodiment of flail knife, shown in Figures 13, 14 and 15, distinguishes from the second embodiment in the respect of having a curved section 111 between the straight flat shank 41" and the outwardly turned portion 39".

Having described a preferred embodiment of the invention together with a limited number of modified knife flails employed therein with the view of clearly and concisely illustrating the invention, I claim:

1. Mounting means for mounting an elongated mower unit transversely of and beneath a tractor body whereon there is lifting means; said mounting means comprising thrust members pivotally connectable with laterally-spaced rearward portions of the tractor for forward projection and pivotally connected at respective forward portions thereof with portions of the mower unit spaced lengthwise thereof to accommodate independent vertical movement of the ends of the unit while preventing movement thereof fore and aft of the tractor, a link member pivotally connected with such unit to project lengthwise thereof for pivotal connection with a portion of said tractor to curtail endwise movement of such unit while accommodating up and down motion thereof, and means connected with said unit for supporting the same from said lifting means while accommodating upward movement of the unit independently of force from such lifting means.

2. In tractor mounting means for an elongated mower unit that comprises ground-engaging supporting means upon which it is tiltable about an axis extending lengthwise of the unit for varying the height of cut; said mounting means being for mounting the unit transversely of and beneath a tractor body and comprising thrust means pivotally connectable with a rearward portion of the tractor for forward projection and pivotally connected at a forward portion thereof with the mower unit to accommodate independent vertical movement of its ends while curtailing movement thereof fore and aft of the tractor, a thrust link pivotally connected with said unit to project lengthwise thereof into pivotal connection with a portion of the tractor to curtail lengthwise displacement of the unit while accommodating vertical displacement thereof, and means for adjusting the tilt of said unit.

3. The combination set forth in claim 2, wherein the tilt adjusting means supports a portion of the unit complementally with the ground engaging means.

4. The combination set forth in claim 3, wherein the tilt adjusting means adjustably supports said portion of the unit from the tractor.

5. The combination set forth in claim 2, wherein the tilt adjusting means is operable to pivot the unit about its pivot connection with said thrust means as an expedient for varying the tilt of said unit.

6. The combination set forth in claim 2, wherein the tilt adjusting means comprises a rod projecting transversely of and from the unit and swingable therewith for tilting the same, a support member for the rod to constrain the same against swinging while accommodating endwise movement thereof pursuant to change in elevation of the unit, and means for mounting said support member at selectable positions on the tractor for determining the degree to which the rod is swung.

7. In mounting means for mounting an elongated mower unit transversely of and beneath the body of a tractor provided with belt pulley means on a rear portion thereof for operating a drive pulley at an end of the unit through a belt trained over such pulley and pulley means; said mounting means comprising thrust means pivotally connectable with a rear portion of the tractor for forward projection and pivotally connected at a forward portion thereof with the mower unit to curtail movement of the unit fore and aft of the tractor while accommodating independent upward and downward movement of the ends of the unit about an axis substantially common to a locus about which the belt is swingable at the pulley means pursuant to such upward and downward movement of the unit and the pulley thereon, and elongated strut means pivotally connected with the unit for projection lengthwise thereof into pivotal connection with the tractor to curtail endwise movement of the unit while accommodating upward and downward movement thereof relatively to the tractor.

CARL W. MOTT.

REFERENCES CITED

The following references are of record in the file of this patent:

UNITED STATES PATENTS

| Number | Name | Date |
| --- | --- | --- |
| 1,303,606 | Slimm | May 13, 1919 |
| 1,326,256 | Ellis | Dec. 30, 1919 |
| 1,372,339 | Cook | Mar. 22, 1921 |
| 1,688,119 | Fedler | Oct. 16, 1928 |
| 2,120,671 | Jensen et al. | June 14, 1938 |
| 2,214,498 | Dennis | Sept. 10, 1940 |
| 2,260,668 | Horste | Oct. 28, 1941 |
| 2,285,306 | Roseman | June 2, 1942 |
| 2,341,486 | Swertfeger | Feb. 8, 1944 |
| 2,422,044 | Ronning et al. | June 10, 1947 |
| 2,475,671 | McCartney | July 12, 1949 |